US009882745B2

(12) United States Patent
Chong et al.

(10) Patent No.: US 9,882,745 B2
(45) Date of Patent: Jan. 30, 2018

(54) METHOD AND APPARATUS FOR PERFOMING CELL SEARCH AND FREQUENCY OFFSET ESTIMATION

(71) Applicant: Samsung Electronics Co., Ltd., Gyeonggi-do (KR)

(72) Inventors: Dah-Hae Chong, Gyeonggi-do (KR); Ho-Il Kim, Gyeonggi-do (KR); Soo-Bok Yeo, Gyeonggi-do (KR); Min-Goo Kim, Gyeonggi-do (KR); Chae-Hag Yi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 323 days.

(21) Appl. No.: 14/750,413

(22) Filed: Jun. 25, 2015

(65) Prior Publication Data

US 2016/0234761 A1     Aug. 11, 2016

(30) Foreign Application Priority Data

Feb. 11, 2015  (KR) .................. 10-2015-0020850
Mar. 12, 2015  (KR) .................. 10-2015-0034364

(51) Int. Cl.
*H04L 25/02* (2006.01)
*H04J 11/00* (2006.01)
*H04L 27/00* (2006.01)

(52) U.S. Cl.
CPC ........ *H04L 25/024* (2013.01); *H04J 11/0069* (2013.01); *H04L 27/0014* (2013.01); *H04L 2027/0026* (2013.01)

(58) Field of Classification Search
CPC .......... H04L 2027/0026; H04L 25/024; H04L 27/0014; H04J 11/0069
See application file for complete search history.

(56) References Cited

U.S. PATENT DOCUMENTS

| 6,728,203 | B2 | 4/2004 | Wang | |
| 7,194,011 | B1* | 3/2007 | Nassiri-Toussi | ... H04B 1/70735 370/320 |
| 2002/0034944 | A1* | 3/2002 | Tanno | .................. H04B 1/7075 455/434 |

(Continued)

*Primary Examiner* — Asad Nawaz
*Assistant Examiner* — Saad A Waqas
(74) *Attorney, Agent, or Firm* — The Farrell Law Firm, P.C.

(57) ABSTRACT

Methods and apparatuses are provided for performing a cell search by a receiver in a communication system. A scrambling code is identified by correlating a common pilot channel with a first synchronization accumulation length based on a frame boundary and a code group. A multipath signal is sought by correlating the common pilot channel with a second synchronization accumulation length based on the frame boundary and the code group. A difference between, or a ratio of, a first maximum value of first correlation values acquired during identification of the scrambling code and a second maximum value of second correlation values acquired during searching for the multipath signal, is determined. It is determined whether a frequency offset exists by comparing the difference or the ratio with a predetermined threshold value. The frequency offset is estimated and the frequency offset is transmitted to a demodulator, when the frequency offset exists.

20 Claims, 5 Drawing Sheets

(56) References Cited

U.S. PATENT DOCUMENTS

| | | | |
|---|---|---|---|
| 2003/0095516 A1* | 5/2003 | Ok | H04B 1/70735 370/331 |
| 2005/0002442 A1 | 1/2005 | Litwin et al. | |
| 2005/0002446 A1* | 1/2005 | Litwin | H04B 1/70735 375/150 |
| 2005/0047530 A1* | 3/2005 | Lee | H04B 7/086 375/343 |
| 2007/0025429 A1* | 2/2007 | Hahm | H04B 1/7115 375/150 |
| 2007/0195864 A1* | 8/2007 | Jonsson | H04B 1/70754 375/148 |
| 2009/0034589 A1* | 2/2009 | Hahm | H04B 1/7075 375/150 |
| 2009/0041162 A1* | 2/2009 | Li | H04B 1/70735 375/340 |
| 2009/0080385 A1* | 3/2009 | Kim | H04J 11/0069 370/336 |
| 2010/0309900 A1* | 12/2010 | Li | H04B 1/70735 370/342 |
| 2012/0015653 A1* | 1/2012 | Paliwal | H04W 24/10 455/435.1 |
| 2015/0382316 A1* | 12/2015 | Bogatu | H04W 56/0015 370/335 |

\* cited by examiner

METHOD AND APPARATUS FOR PERFOMING CELL SEARCH AND FREQUENCY OFFSET ESTIMATION

PRIORITY

This application claims priority under 35 U.S.C. § 119(a) to Korean Application Serial No. 10-2015-0020850, which was filed in the Korean Intellectual Property Office on Feb. 11, 2015, and Korean Application Serial No. 10-2015-0034364, which was filed in the Korean Intellectual Property Office on Mar. 12, 2015, the contents of which are incorporated herein by reference.

BACKGROUND

1. Field of the Disclosure

The present disclosure relates to a method and an apparatus for performing a cell search and a frequency offset estimation in a communication system.

2. Description of the Related Art

A general cell search process of a receiver that is used in a communication system includes three steps. The first step involves slot boundary identification using a primary synchronization channel (P-SCH). The second step involves frame boundary and code group identification using a secondary synchronization channel (S-SCH). The third step involves scrambling code identification using a primary common pilot channel (P-CPICH). A step that involves a multipath search using the P-CPICH may be added for timing configuration by a demodulator.

The above-described steps for the cell search process determine whether information required for the respective steps is detected using a correlation value between a received signal and a specific progression. Due to the existence of a frequency offset in a general wireless communication environment, a phase of the received signal rotates and the correlation value deteriorates, thereby reducing the effectiveness of the cell search.

When the frequency offset exists, if a coherent accumulation length is configured to be small, an influence of the frequency offset on the correlation value may be reduced. However, this also results in a reduction in a noise suppression effect through the synchronous accumulation. Further, although cell search performance may be more effective, information on the frequency offset cannot be transmitted to the demodulator, thereby reducing a demodulation success rate.

In another method, after scrambling code identification in the third step of the cell search process, fast fourier transform (FFT) is performed on a correlation value between a despread result of the received signal and a CPICH pattern in every slot. An index of the maximum value generated by curve fitting values around the largest value of the FFT outputs is derived as a frequency offset. Further, a cell search success/failure is determined by comparing an FFT output-based metric with a predetermined threshold value. This method can increase the effectiveness of the cell search, but also increases implementation complexity due to the use of a separate FFT device. Further, since the FFT and curve fitting operations are required to be performed in every search, power consumption and cell search time increase.

As described above, when the frequency offset exists, the conventional technologies can improve the effectiveness of the cell search, but do not consider that frequency offset estimation for improving demodulation capability should be performed after the cell search, or that such an estimation increases implementation complexity, power consumption, and cell search time.

SUMMARY

An aspect of the present disclosure provides a method and an apparatus for performing a cell search and for estimating the frequency offset, in which demodulation performance is improved by estimating frequency offset information during a cell search process and transmitting the estimated frequency offset information to a demodulator.

In accordance with an aspect of the present disclosure, a method is provided for performing a cell search by a receiver in a communication system. A scrambling code is identified by correlating a common pilot channel with a first synchronization accumulation length based on a frame boundary and a code group. A multipath signal is sought by correlating the common pilot channel with a second synchronization accumulation length based on the frame boundary and the code group. A difference between, or a ratio of, a first maximum value of first correlation values acquired during identification of the scrambling code and a second maximum value of second correlation values acquired during searching for the multipath signal, is determined. It is determined whether a frequency offset exists by comparing the difference or the ratio with a predetermined threshold value. The frequency offset is estimated and the frequency offset is transmitted to a demodulator, when the frequency offset exists.

In accordance with another aspect of the present disclosure, an apparatus is provided for performing a cell search in a communication system. The apparatus includes a scrambling code detection unit configured to identify a scrambling code by correlating a common pilot channel with a first synchronization accumulation length based on a frame boundary and a code group. The apparatus also includes a multipath search unit configured to search for a multipath signal by correlating the common pilot channel with a second synchronization accumulation length based on the frame boundary and the code group. The apparatus further includes a comparator configured to determine a difference between, or a ratio of, a first maximum value of first correlation values acquired during identification of the scrambling code and a second maximum value of second correlation values acquired during searching for the multipath signal. The comparator is also configured to determine whether a frequency offset exists by comparing the difference or the ratio with a predetermined threshold value. The comparator is further configured to estimate the frequency offset and transmit the frequency offset to a demodulator, when the frequency offset exists.

In accordance with another aspect of the present disclosure, a chip set is provided for performing a cell search in a communication system. The chip set is configured to identify a scrambling code by correlating a common pilot channel with a first synchronization accumulation length based on a frame boundary and a code group. The chip set is also configured to search for a multipath signal by correlating the common pilot channel with a second synchronization accumulation length based on the frame boundary and the code group. Additionally, the chip set is configured to determine a difference between, or a ratio of, a first maximum value of first correlation values acquired during identification of the scrambling code and a second maximum value of second correlation values acquired during searching for the multipath signal. The chip set is further configured to determine whether a frequency offset exists by comparing the difference or the ratio with a predetermined threshold value, and estimate the frequency offset and transmit the frequency offset to a demodulator, when the frequency offset exists.

Accordingly, the embodiments of the present disclosure provide methods and apparatuses for performing a cell search in which a difference between, or a ratio of, maximum correlations values are compared to a threshold to determine the existence of a frequency offset.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
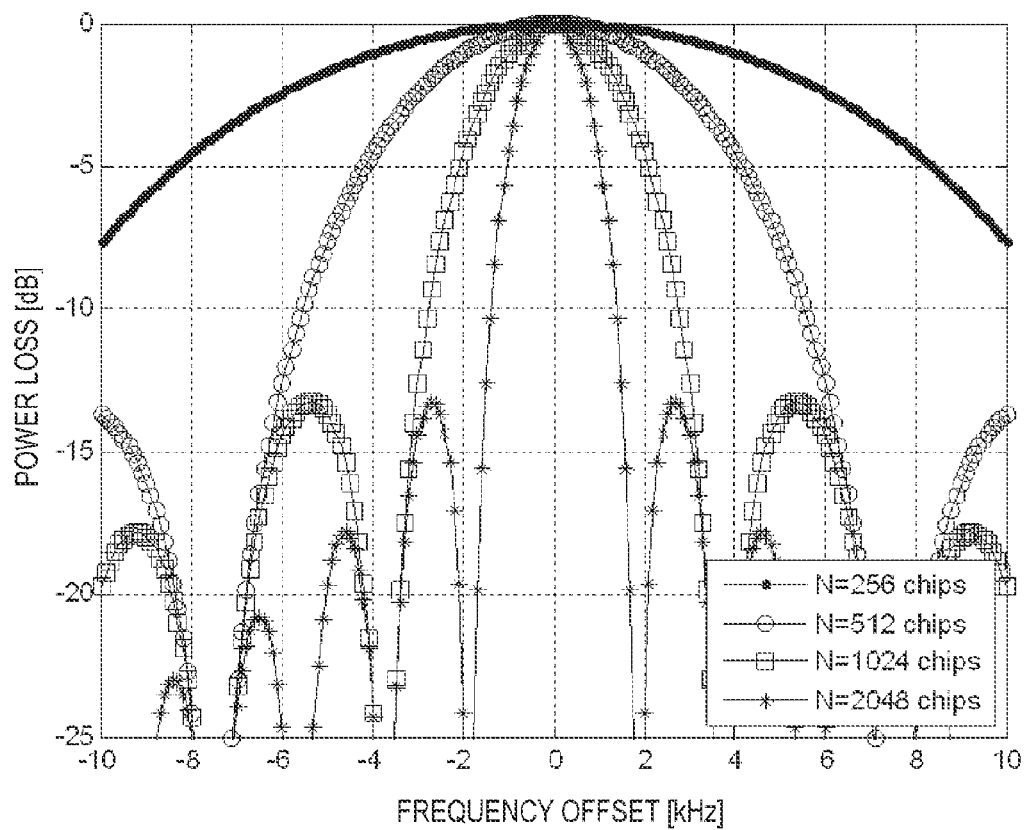
FIG. 1 is a chart illustrating a loss of output power of a correlator according to a frequency offset size and a coherent accumulation length when a frequency offset of a wideband code division multiple access (WCDMA) transmission signal exists.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter described herein.

Singular expressions such as "an" and "the" include plural expressions as well, unless the context clearly indicates otherwise. Accordingly, as an example, a "component surface" includes one or more component surfaces. Although terms including an ordinal number such as first, second, etc., may be used for describing various elements, the structural elements are not restricted by these terms. Instead, the terms are used to distinguish an element from other elements. For example, a first element may be referred to as a second element, and similarly, a second element may also be referred to as a first element without departing from the scope of the present disclosure. As used herein, the term "and/or" includes any and all combinations of one or more associated items.

In the present disclosure, terms such as "include" and/or "have" may be construed to denote a certain characteristic, number, step, operation, constituent element, component or a combination thereof, but may not be construed to exclude the existence or a possibility of one or more additional characteristics, numbers, steps, operations, constituent elements, components or combinations thereof.

Unless defined otherwise, all terms used herein, including technical and scientific terms, have the same meanings as those commonly understood by a person of ordinary skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined herein.

According to various embodiments of the present disclosure, a terminal may include a communication functionality. The terminal may, for example, be embodied as a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present disclosure, the terminal may be embodied as a smart home appliance with a communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box, a gaming console, an electronic dictionary, a camcorder, or an electronic photo frame.

According to various embodiments of the present disclosure, the terminal may be embodied as a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present disclosure, the terminal may be embodied as a part of furniture or a building/structure, an electronic board, an electronic signature receiving device, a projector, and various kinds of measuring instruments (e.g., water meter, electric meter, gas meter, and electromagnetic wave meter), each of which has a communication functionality. According to various embodiments of the present disclosure, the terminal may be embodied as a combination of two or more of the above-described devices. Further, it will be apparent to those skilled in the art that the terminal, according to various embodiments of the present disclosure, is not limited to the above-described devices.

A method and an apparatus proposed by an embodiment of the present disclosure can be applied to mobile broadcasting services including, for example, an Institute of Electrical and Electronics Engineers (IEEE) 802.11ac communication system, an IEEE 802.16 communication system, a digital multimedia broadcasting (DMB) service, a digital video broadcasting-handheld (DVB-H), and a mobile/portable Advanced Television Systems Committee mobile/handheld (ATSC-M/H) service, and various communication systems including, for example, a digital video broadcasting system such as an Internet protocol television (IPTV) service, a Moving Picture Experts Group (MPEG) media transport (MMT) system, an evolved packet system (EPS), a long-term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system of $3^{rd}$ Generation Project Partnership 2 (3GPP2), a WCDMA mobile communication system of 3GPP2, a code division multiple access (CDMA) mobile communication system of 3GPP2, and a mobile Internet protocol (Mobile IP) system.

According to the present disclosure, based on the fact that the correlation value varies depending on the coherent accumulation length of the correlator when the frequency offset exists, accumulation lengths are synchronous for the two steps using the P-CPICH (that is, the scrambling code identification step and the multipath search step). Further, it is determined that the frequency offset exists when a difference between two correlation values is greater than or equal to a reference value. Accordingly, a phase of the received signal or the code is compensated and a cell re-search is performed according to a particular frequency offset candidate value. The most reliable result is selected from the search results.

Herein, although a receiver used in a 3GPP WCDMA system is described as an example, the present disclosure can be applied to receivers of all communication systems in which a cell search is performed using a correlation value.

As described above, according to embodiments of the present disclosure, the correlation value varies depending on the coherent accumulation length of the correlator when the frequency offset exists. Accordingly, a description of how the correlation value changes according to the frequency offset and the coherent accumulation length is set forth below.

A transmitted signal may be modeled as set forth in Equation (1) below:

$$s(t) = \sqrt{\frac{E_c}{2}} \sum_{i=-\infty}^{\infty} c_i u(t - iT_c) \qquad (1)$$

In Equation (1), Ec denotes power of the transmitted signal, $c_i$ denotes an $i^{th}$ scrambled code chip, and u(t) denotes a square waveform having a period and unit power of Tc. According to an embodiment of the present disclosure, it is assumed that noise and channel effects are not considered in determining an effect of the frequency offset. After a carrier is demodulated, a received signal may be modeled as shown in Equation (2) below.

$$r(t) = s(t)\exp(j2\pi f_e t) \qquad (2)$$

In Equation (2), fe denotes a frequency offset in of Hz. When the coherent accumulation length of the correlator is N, power Pcorr of the output of the correlator, defined by the coherent accumulation length, may be calculated by Equation (3) below, when the frequency offset fe is not 0.

$$\begin{aligned} P_{corr} &= \left| \frac{1}{NT_c} \int_0^{NT_c} r(t) s^*(t) dt \right|^2 \qquad (3) \\ &= \left| \frac{\sqrt{E_c}}{NT_c} \int_0^{NT_c} \exp(j2\pi f_e t) dt \right|^2 \\ &= \left| \frac{\sqrt{E_c} \sin(2\pi f_e NT_c)}{2\pi f_e NT_c} + \frac{j\sqrt{E_c}(1 - \cos(2\pi f_e NT_c))}{2\pi f_e NT_c} \right|^2 \\ &= \frac{E_c(2 - 2\cos(2\pi f_e NT_c))}{(2\pi f_e NT_c)^2} \\ &= E_c \left( \frac{\sin(\pi f_e NT_c)}{\pi f_e NT_c} \right)^2 \end{aligned}$$

Accordingly, Pcorr may be defined as shown in Equation (4) below, with respect to fe.

$$\begin{cases} E_c \left( \frac{\sin(\pi f_e NT_c)}{\pi f_e NT_c} \right)^2, & \text{when } f_e \neq 0 \\ E_c, & \text{when } f_e = 0 \end{cases} \qquad (4)$$

FIG. 1 is a chart illustrating a loss of power of the output of the correlator according to a frequency offset size and a coherent accumulation length when a frequency offset of a WCDMA transmission signal exists.

As illustrated in FIG. 1, although sizes of frequency offsets are the same, power loss amounts may be different according to a coherent accumulation length (N).

Accordingly, an embodiment of the present disclosure provides a cell search method using a power difference of outputs of the correlator according to the frequency offset and the coherent accumulation length.

The output power of the correlator is expressed herein as a correlation value. Further, although a cell search of WCDMA is described herein, the present disclosure may be applied to receivers of all communication systems in which a cell search is performed using a correlation value.

Figure 2:
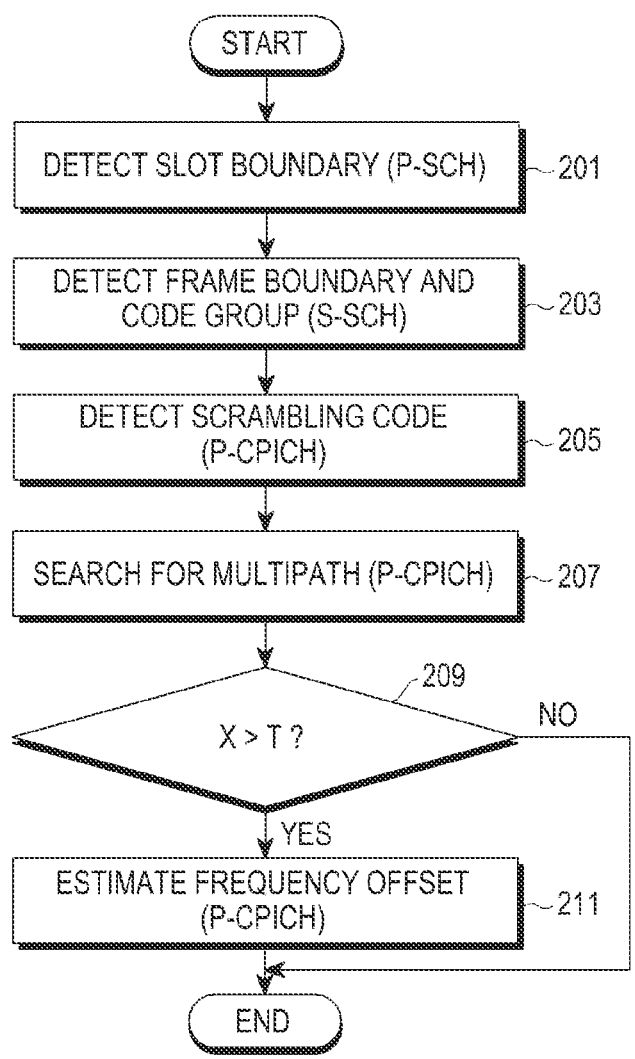
FIG. 2 is a flowchart illustrating a cell search process, according to an embodiment of the present disclosure.

FIG. 2 is a flowchart illustrating a cell search process, according to an embodiment of the present disclosure.

Referring to FIG. 2, a slot boundary is detected by correlating a P-SCH transmitted by a base station (BS), in step 201. In a state where time slots are synchronized through the acquisition of the slot boundary, a frame boundary and a code group of the BS are detected by correlating an S-SCH, in step 203. In step 205, a scrambling code is identified by correlating the P-CPICH transmitted by the BS based on the acquired frame boundary and code group. A multipath signal is sought by correlating the P-CPICH again, in step 207. In the correlations of the P-CPICH in steps 205 and 207, coherent accumulation lengths are configured to be different.

Since the coherent accumulation lengths are different when the frequency offset exists, a maximum correlation value of the correlation values calculated according to respective scrambling code candidates in step 205 and a maximum value of the correlation values calculated according to respective multipath signal candidates in step 207 are different from each other. The difference between the correlation values substantially increases as the frequency offset increases. Accordingly, the difference or ratio X is acquired by comparing the maximum correlation value of step 205 and the maximum correlation value of step 207. In step 209, it is determined whether X is greater than a threshold value T. When noise exists, although the frequency offset does not exist, the threshold T may be set with a proper margin based on the fact that the difference between the maximum correlation values is 0 or the fact that it is difficult for the ratio of the maximum correlation values to be 1.

When X is greater than T, the frequency offset value is estimated based on the determination that a frequency offset exists that is greater than or equal to a reference value in the received signal, in step 211. When X is less than or equal to T, the cell search ends based on the determination that there is no frequency offset that is greater than or equal to the reference value. In this case, when X is the difference between the maximum correlation values corresponding 0, or when X is not the ratio of the maximum correlation values corresponding to 1, the non existence of the frequency offset that is greater than or equal to the reference value is considered to be due to an influence of noise. According to an embodiment of the present disclosure, in steps 205 and 207, when Ec/Io estimation is supported, the cell search method may compare a difference or a ratio between Ec/Io estimated during respective processes, instead of the correlation values, with a threshold value.

Figure 3:
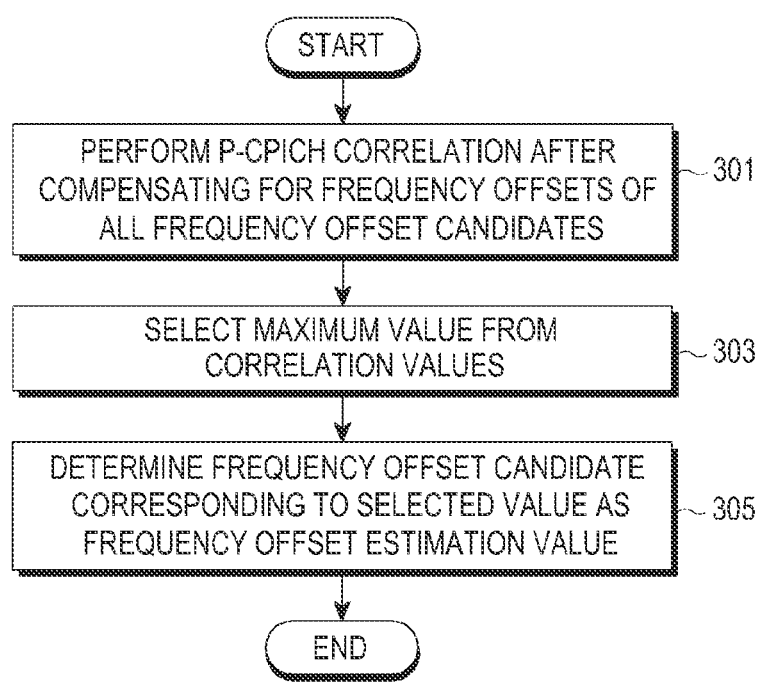
FIG. 3 is a flowchart illustrating a frequency offset estimation process, according to an embodiment of the present disclosure.

FIG. 3 is a flowchart illustrating a frequency offset estimation process, according to an embodiment of the present disclosure.

Referring to FIG. 3, after a phase of a received signal or a code is first compensated for by using frequency offset candidates, P-CPICH correlation is performed, in step 301. For example, when there are 5 frequency offset candidates, a total of 5 P-CPICH correlations are performed. When the P-CPICH correlations are completed for all frequency offset candidates, a maximum value is selected from all of the correlation values, in step 303. A frequency offset candidate, which has been used for acquiring the selected maximum value, is determined as a frequency offset estimation value, in step 305. The correlation values acquired in step 301 may be obtained in the form of power through a square and sum operation, and various square and sum operation results may be combined.

An interval between and the number of frequency offset candidates may be determined by the user within a frequency offset generation range based on a frequency offset size, which may influence the capability of the demodulation step after the cell search. In general, the interval between the candidates may be up to two times the acceptable frequency offset range in the demodulator. For example, when the frequency offset generation range is from −10 kHz to 20 kHz, and when there is little influence on the capability of the receiver although the demodulator accepts a frequency offset of about 2.5 kHz, the frequency offset candidates may be determined as −10, −5, 0, 5, and 10 kHz. In this case, a difference between a selectable frequency offset estimation value and an actual frequency offset is within 2.5 kHz, and a total of 5 P-CPICH correlations should be performed to estimate the frequency offsets, according to an embodiment of the present disclosure. Further, in the system implementation, the 5 correlations may be performed by one P-CPICH correlator or the 5 correlations may be performed by five P-CPICH correlators, respectively, which may be determined by the user based on a cell search time or implementation complexity.

As described above, according to an embodiment of the present disclosure, when X, which corresponds to the difference value or the ratio of results of the P-CPICH correlation (correlation value or Ec/Io), is greater than the predetermined threshold value T, it is determined that the frequency offset is greater than or equal to a predetermined reference. Thus, an operation for the frequency offset estimation is performed, thereby slightly increasing an average cell search time and power consumption. Further, when the process for the frequency offset estimation is implemented by one P-CPICH correlator, additional hardware, with respect to a conventional apparatus, is not required, except for a comparator for comparing X and T. The P-CPICH correlator for the frequency offset estimation may be the P-CPICH correlator used in steps 205 and 207 during the cell search process.

Figure 4:
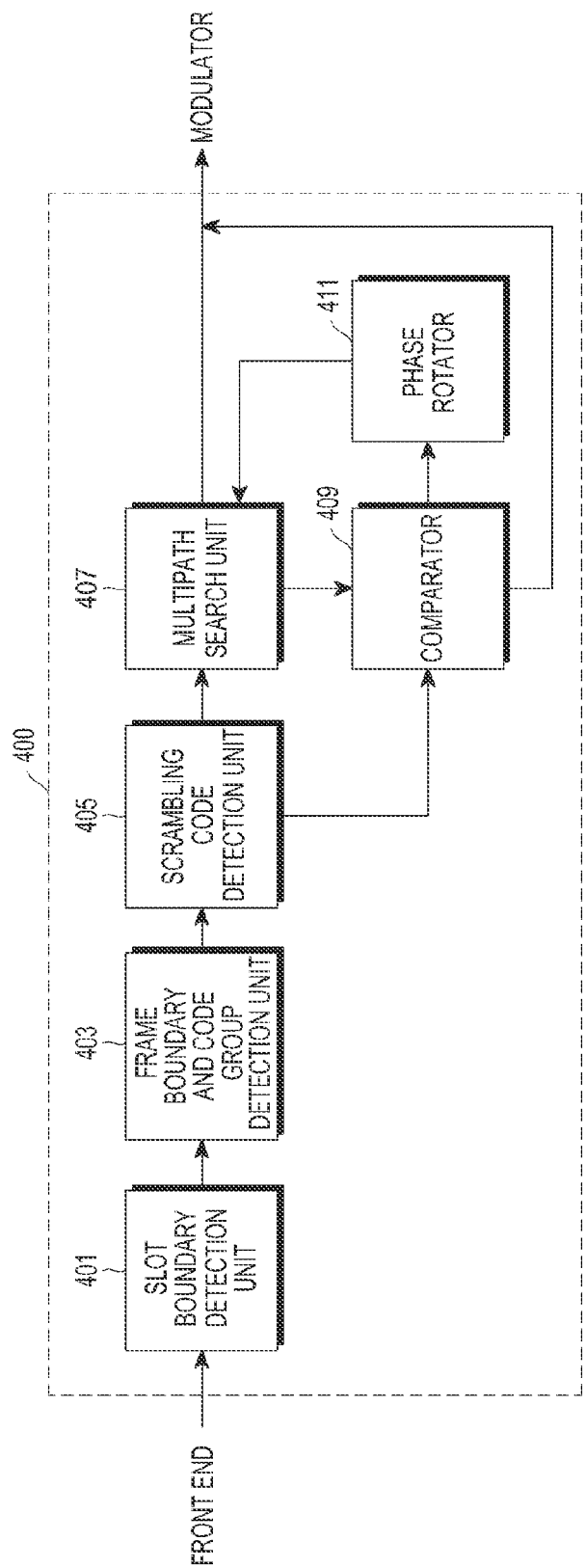
FIG. 4 is a diagram illustrating a configuration of a cell searcher, according to an embodiment of the present disclosure.

FIG. 4 is a diagram illustrating a configuration of a cell searcher, according to an embodiment of the present disclosure.

Referring to FIG. 4, when signal processing of a received signal ends by a front end, a cell searcher 400 begins a cell search. A slot boundary detection unit 401 detects a slot boundary through P-SCH correlation. A frame boundary and code group detection unit 403 detects a frame boundary and a code group through S-SCH correlation. A scrambling code detection unit 405 identifies a scrambling code through P-CPICH correlation. A multipath search unit 407 searches for a multipath signal. A maximum correlation value according to a correlation by the multipath search unit 407 and a maximum correlation value according to a correlation by the scrambling code detection unit 405 are transmitted to a comparator 409.

The comparator 409 determines a difference between the two maximum correlation values, and compares that difference with a predetermined threshold value. When the difference between the maximum correlation values is less than or equal to the predetermined threshold value, the cell search ends and a demodulation process starts. When the difference value between the maximum correlation values is greater than the predetermined threshold value, the comparator 409 transmits a result of the comparison to a phase rotator 411. The phase rotator 411 compensates for a phase of a received signal or a code of a frequency offset candidate, and transmits the compensated signal to the multipath search unit 407. The multipath search unit 407 re-performs a multipath signal search.

The compensation for the phase of the received signal or the code and the re-performance of the multipath signal search are repeated a number of times equal to the number of frequency offset candidates. When the process ends, correlation values generated in the re-performance of the multipath signal search are compared and a frequency offset candidate used for acquiring a maximum correlation value is determined as a frequency offset estimation value, and the cell search ends. Information on the determined frequency offset estimation value is transmitted to a demodulator.

Figure 5:
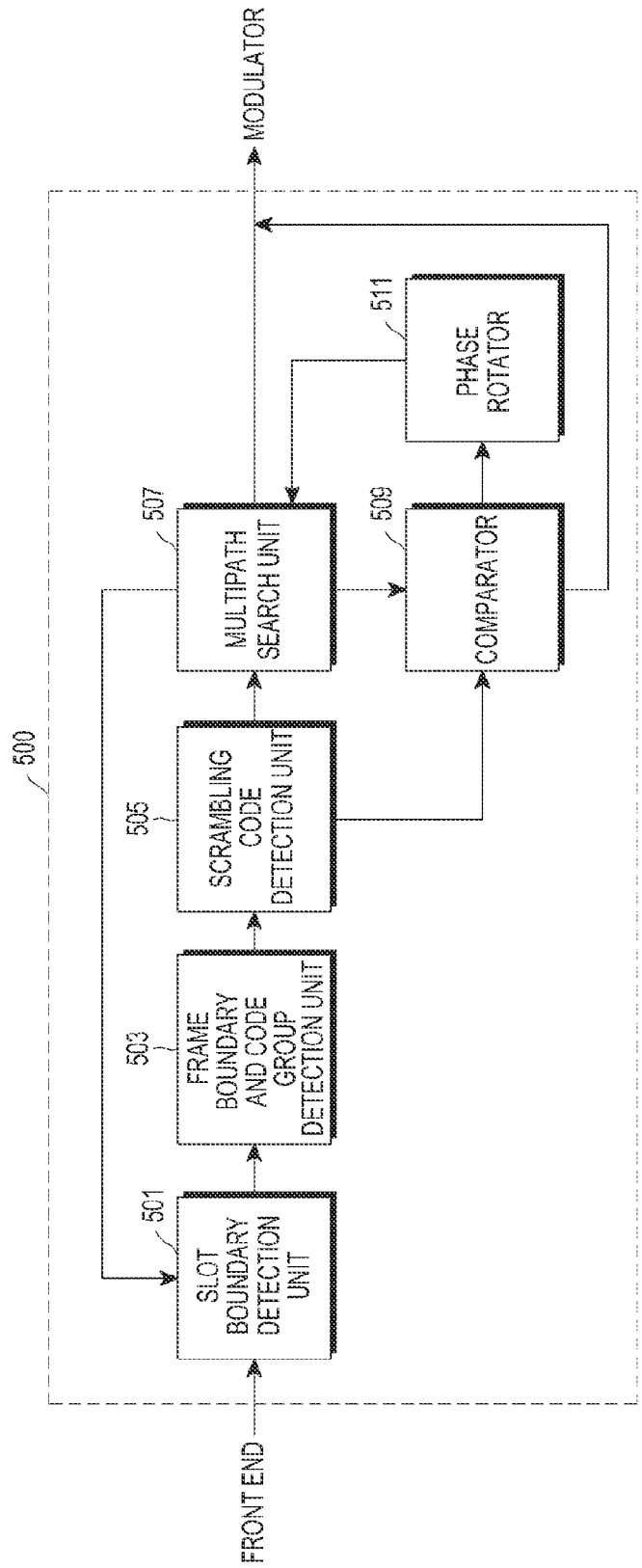
FIG. 5 is a diagram illustrating a configuration of a cell searcher, according to another embodiment of the present disclosure.

FIG. 5 is a diagram illustrating a configuration of a cell searcher, according to another embodiment of the present disclosure.

Referring to FIG. 5, a configuration of a cell searcher is substantially identical to the configuration of the cell searcher of FIG. 4, except for a path from a multipath search unit 507 to a slot boundary detection unit 501. Thus, the slot boundary detection unit 501, a frame boundary and code group detection unit 503, a scrambling code detection unit 505, the multipath search unit 507, a comparator 509, and a phase rotator 511 of a cell searcher 500 are substantially identical to the corresponding element of the cell search 400 in FIG. 4. When the cell searcher 500 is implemented as illustrated in FIG. 5, a cell search process that returns to a slot boundary detection step without performing a demodulation process when a multipath signal search fails may be selectively performed together with a cell search process by the cell searcher 400 of FIG. 4.

The correlation value acquired through the performance of each of the operations in FIGS. 2 to 5 refers to an absolute size. Further, although FIGS. 4 and 5 illustrate examples for implementing the cell search process, according to embodiments of the present disclosure, it is apparent to those skilled in the art that an implementation method of the present disclosure is not limited thereto. In addition, the cell searcher, according to an embodiment of the present disclosure, may further include a controller for controlling each component, and a memory for storing a reference value, a threshold value, a frequency offset candidate group, and an estimated frequency offset. Furthermore, the detection units and the multipath search units of FIGS. 4 and 5 may include a code generator for generating a code for correlation, a synchronous correlation between the generated code and a received signal, and a square-sum calculator for calculating power based on the result of the synchronous correlation.

As described above, embodiments of the present disclosure increase the effectiveness of the cell search. Since the embodiments of the present disclosure can rapidly and successfully perform a cell search with lower implementation complexity as compared to the conventional cell search method and apparatus, and can also estimate substantial frequency offset information, a receiver that performs the cell search has competitive power in terms of quality and implementation complexity compared to a conventional receiver.

The present disclosure can increase the cell search capability without increased hardware complexity and cell search time.

Some aspects of the present disclosure may also be implemented as a computer readable code in a computer readable recording medium. The computer readable recording medium is any type of data storage device that is capable of storing data readable by a computer system. Examples of the computer readable recording medium may include a read-only memory (ROM), a random access memory (RAM), a compact disc-ROM (CD-ROM), a magnetic tape, a floppy disk, an optical data storage device, and a carrier wave (such as, for example, data transmission through the Internet). The computer readable recording medium may also be distributed over network-coupled computer systems so that the computer readable code is stored and executed in a distributed fashion. Further, functional programs, codes, and code segments for achieving embodiments of the present disclosure may be readily interpreted by programmers skilled in the art to which the present disclosure pertains.

It will be understood that a method and an apparatus, according to an embodiment of the present disclosure, may be implemented in the form of hardware, software, or a combination of hardware and software. Any such software may be stored, for example, in a volatile or non-volatile storage device such as, for example, a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and an apparatus, according to an embodiment of the present disclosure, may be implemented by a computer or portable terminal including a controller and a memory, and the memory is an example of a machine readable device adapted to store a program or programs including instructions for implementing embodiments of the present disclosure.

Accordingly, embodiments of the present disclosure include a program including a code for implementing the apparatus or method described herein and a machine (computer or the like) readable storage medium for storing the program. Further, the program may be electronically carried by any medium such as a communication signal transferred through a wired or wireless connection, and the present disclosure appropriately includes equivalents thereof.

An apparatus, according to an embodiment of the present disclosure, may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device, or automatically.

Embodiments of the present disclosure may be utilized in conjunction with the manufacture of integrated circuits, or chip sets. Regarding integrated circuits in general, a plurality of identical die are typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits and chip sets are considered part of this disclosure.

While certain embodiments have been shown and described, it will be understood by those skilled in the art that various changes in form and detail may be made therein without departing from the spirit and scope of the disclosure as defined by the appended claims.

What is claimed is:

1. A method of performing a cell search by a terminal in a communication system, the method comprising:
    identifying a scrambling code by correlating a common pilot channel with a first synchronization accumulation length based on a frame boundary and a code group;
    searching for a multipath signal by correlating the common pilot channel with a second synchronization accumulation length based on the frame boundary and the code group;
    determining a difference between, or a ratio of, a first maximum value of first correlation values acquired during identification of the scrambling code and a second maximum value of second correlation values acquired during searching for the multipath signal;
    determining whether a frequency offset exists by comparing the difference or the ratio with a predetermined threshold value; and
    estimating the frequency offset and transmitting the frequency offset to a demodulator, when the frequency offset exists,
    wherein the first synchronization accumulation length is different from the second synchronization accumulation length.

2. The method of claim 1, wherein estimating the frequency offset comprises:
    compensating for a phase of a received signal or a code with respect to each of a plurality of predetermined frequency offset candidates;
    re-identifying the scrambling code by correlating the common pilot channel with the first synchronization accumulation length or re-searching for the multipath signal by correlating the common pilot channel with the second synchronization accumulation length based on a signal with the phase having been compensated for; and
    selecting a third maximum value of third correlation values acquired during the re-identifying of the scrambling code or a fourth maximum value of fourth correlation values acquired during the re-searching of the multipath signal, determining a frequency offset candidate corresponding to the selected maximum value as the frequency offset, and transmitting the frequency offset to the demodulator.

3. The method of claim 1, wherein the first correlation values and the second correlation values are power values acquired by performing a square and sum operation.

4. The method of claim 1, wherein determining whether the frequency offset exists comprises:

when the difference is compared with the threshold value, determining that the frequency offset exists if the difference is greater than 0; and when the ratio is compared with the threshold value, determining that the frequency offset exists if the ratio of a larger value to a smaller value of the first and second maximum values is greater than 1.

5. The method of claim 2, wherein a number of frequency offset candidates is determined within a predetermined frequency offset range according to an interval between the frequency offset candidates.

6. The method of claim 2, wherein compensating for the phase comprises rotating a phase of the received signal or the code by using the plurality of frequency offset candidates and the received signal or the code.

7. The method of claim 2, wherein the third correlation values are power values acquired by performing a square and sum operation.

8. The method of claim 1, further comprising:
detecting a slot boundary by correlating a first synchronization channel signal; and
detecting the frame boundary and identifying the code group by correlating a second synchronization channel signal based on slot boundary.

9. An apparatus for performing a cell search in a communication system, the apparatus comprising:
a scrambling code detection unit configured to identify a scrambling code by correlating a common pilot channel with a first synchronization accumulation length based on a frame boundary and a code group;
a multipath search unit configured to search for a multipath signal by correlating the common pilot channel with a second synchronization accumulation length based on the frame boundary and the code group; and
a comparator configured to:
determine a difference between, or a ratio of, a first maximum value of first correlation values acquired during identification of the scrambling code and a second maximum value of second correlation values acquired during searching for the multipath signal;
determine whether a frequency offset exists by comparing the difference or the ratio with a predetermined threshold value; and
estimate the frequency offset and transmit the frequency offset to a demodulator, when the frequency offset exists,
wherein the first synchronization accumulation length is different from the second synchronization accumulation length.

10. The apparatus of claim 9, further comprising a phase rotator configured to compensate for a phase of a received signal or a code with respect to each of a plurality of predetermined frequency offset candidates when it is determined that the frequency offset exists,
wherein the scrambling code detection unit is further configured to re-identify the scrambling code by correlating the common pilot channel with the first synchronization accumulation length based on a signal with the phase having been compensated for, the multipath search unit is further configured to re-search for the multipath signal by correlating the common pilot channel with the second synchronization accumulation length based on a signal with the phase having been compensated for, and
wherein the comparator is further configured to select a third maximum value of third correlation values acquired during the re-identifying of the scrambling code or a fourth maximum value of fourth correlation values acquired during the re-searching of the multipath signal, determine a frequency offset candidate corresponding to the third maximum value as the frequency offset, and transmit the frequency offset to the demodulator.

11. The apparatus of claim 9, wherein the first correlation values and the second correlation values are power values acquired by performing a square and sum operation.

12. The apparatus of claim 9, wherein, when the difference is compared with the threshold value, the comparator is further configured to determine that the frequency offset exists if the difference is greater than 0, and, when the ratio is compared with the threshold value, the comparator is further configured to determine that the frequency offset exists if the ratio of a larger value to a smaller value of the first and second maximum values is greater than 1.

13. The apparatus of claim 10, wherein a number of frequency offset candidates is determined within a predetermined frequency offset range according to an interval between the frequency offset candidates.

14. The apparatus of claim 10, wherein the phase rotator is further configured to rotate a phase of the received signal or the code by using the plurality of frequency offset candidates and the received signal or the code.

15. The apparatus of claim 10, wherein third correlation values are power values acquired by performing a square and sum operation.

16. The apparatus of claim 9, further comprising:
a slot boundary detection unit configured to detect a slot boundary by correlating a first synchronization signal; and
a scrambling code detection unit configured to detect the frame boundary and the code group by correlating a second synchronization channel signal based on slot boundary.

17. A chip set for performing a cell search method in a communication system, the method comprising:
identifying a scrambling code by correlating a common pilot channel with a first synchronization accumulation length based on a frame boundary and a code group;
searching for a multipath signal by correlating the common pilot channel with a second synchronization accumulation length based on the frame boundary and the code group;
determining a difference between, or a ratio of, a first maximum value of first correlation values acquired during identification of the scrambling code and a second maximum value of second correlation values acquired during searching for the multipath signal;
determining whether a frequency offset exists by comparing the difference or the ratio with a predetermined threshold value; and
estimating the frequency offset and transmit the frequency offset to a demodulator, when the frequency offset exists,
wherein the first synchronization accumulation length is different from the second synchronization accumulation length.

18. The method of claim 17, wherein to estimate the frequency offset, the method further comprises:
compensating for a phase of a received signal or a code with respect to each of a plurality of predetermined frequency offset candidates;
re-identifying the scrambling code by correlating the common pilot channel with the first synchronization accumulation length or re-search for the multipath signal by correlating the common pilot channel with the second synchronization accumulation length based on a signal with the phase having been compensated for; and selecting a third maximum value of third correlation values acquired during the re-identifying of the scrambling code or a fourth maximum value of fourth correlation values acquired during the re-searching of the multipath signal, determining a frequency offset candidate corresponding to the selected maximum value as the frequency offset, and transmitting the frequency offset to the demodulator.

19. The method of claim 17, wherein the first correlation values and the second correlation values are power values acquired by performing a square and sum operation.

20. The method of claim 17, wherein to determine whether the frequency offset exists, the method further comprises:

when the difference is compared with the threshold value, determining that the frequency offset exists if the difference is greater than 0; and when the ratio is compared with the threshold value, determining that the frequency offset exists if the ratio of a larger value to a smaller value of the first and second maximum values is greater than 1.

* * * * *

UNITED STATES PATENT AND TRADEMARK OFFICE
CERTIFICATE OF CORRECTION

PATENT NO. : 9,882,745 B2  
APPLICATION NO. : 14/750413  
DATED : January 30, 2018  
INVENTOR(S) : Dah-Hae Chong et al.

Page 1 of 1

It is certified that error appears in the above-identified patent and that said Letters Patent is hereby corrected as shown below:

On the Title Page

(54) Title:
"METHOD AND APPARATUS FOR PERFOMING CELL SEARCH AND FREQUENCY OFFSET ESTIMATION"
Should be:
-- METHOD AND APPARATUS FOR PERFORMING CELL SEARCH AND FREQUENCY OFFSET ESTIMATION --

Signed and Sealed this
Fifteenth Day of January, 2019

Andrei Iancu
*Director of the United States Patent and Trademark Office*